Figure 1:
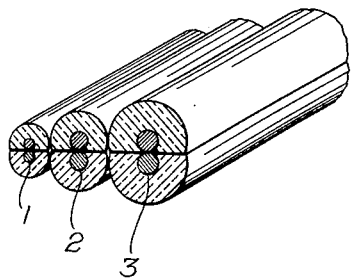

3,210,524
WELDING PROCESS USING TWO PARTLY COATED ELECTRODES TO FORM IN THE WELDING AREA AN ELECTRODE COATED ON ALL SIDES
Harald Strohmeier and Bertram Hebenstreit, Kapfenberg, Austria, assignors to Gebr. Bohler & Co. Aktiengesellschaft, Vienna, Austria
Filed Nov. 19, 1962, Ser. No. 238,450
Claims priority, application Austria, Nov. 25, 1961, A 8,939/61
5 Claims. (Cl. 219—137)

Processes that can be termed continuous welding processes in which two partly coated welding wires of great length, and which are continuously withdrawn from coils, are fed to the welding area are known. Before reaching the welding area, the two electrodes are so guided that their uncoated surfaces engage an electric contact, and are then combined to form an electrode which is coated on all sides.

Such continuous welding processes are in most cases required to operate at a very high welding rate and consequently a rapid progress of welding, and in many cases to accomplish a welding of deep or large cross-sections.

In such cases, a high welding rate can only be obtained if the cross-section of the welding wire is sufficient to enable a rapid deposition of the required material in the joint to be welded. Welding electrodes of relatively large cross-section, however, have the disadvantage that they are not sufficiently flexible to be unwound from coils and to be repeatedly flexed, as in inherent in this process. The requirement of a high rate of fusion is further inconsistent with the requirement of moving the welding wire as far as the root of the fillet joint because a good welded seam can only be achieved if the welding wire can extend closely to the root of the wedge-shaped cross-section of the joint. This requirement as well as that for a closer curvature, however, would call for a welding wire having a small cross-section, as contrasted with the first mentioned requirement.

In order to meet these two mutually inconsistent requirements, namely, for a deep penetration into the fillet joint and for a supply of welded material at a high rate to the joint, attempts have been made to use welding wires having an oval or oblong cross-section. Great difficulties are involved in the manufacture of such welding wires, particularly in coating the same, and in supplying current to the welding wires during welding. Besides, it is difficult to obtain a firm adhesion of the coating composition to electrodes having such cross-sectional shapes.

Pairs of electrodes brought together shortly before the welding area have also failed to accomplish the desired result. While the pair of electrodes supplies large amounts of welding material to the point of welding, the large cross-section of the pair prevents the electrodes from penetrating to the root of the joint to be welded.

In order to meet the aforesaid requirement, it is proposed according to the invention to perform the welding process with a plurality of pairs of electrodes, which are bundled and preferably arranged one beside the other.

The simultaneous use of a plurality of pairs of welding electrodes enables the use of welding wires which due to their relatively small cross-section can sufficiently penetrate into the fillet joint and which are sufficiently flexible for use in the process in which the electrode is repeatedly flexed. In this process the fillet joint may be filled in layers with weld material from the successive pairs of electrodes. A uniform distribution of the weld material, particularly in the upper layeres of the welded seam, is promoted by a pivotal movement of the pairs of electrodes about the axis of one of the pairs. For instance, if all pairs of electrodes associated with each other are pivotally moved about the longitudinal axis of the leading pair of electrodes, which has the deepest penetration into the fillet joint, while the relative position of the pairs of electrodes is not changed, a good and uniformly filled welded seam will be obtained.

Advantageously, the bundle comprises at least one double electrode larger in core cross-section than the leading electrode. For instance, in the case of a wedge-shaped joint, a particularly high welding rate will be obtained if, of a plurality of pairs of electrodes, the electrodes of the first pair, considered in the direction of welding, have a small cross-section for deep penetration to the root of the joint while the electrodes of the following pairs have larger cross-sections corresponding to the upwardly increasing cross-section of the joint.

An advantage of the welding process using such pairs of electrodes resides in that the close spacing of the current supply point from the welding area enables high current to be supplied to the welding area without a high conductors resistance, which would result in an excessive temperature rise of the electrode.

During the welding operation carried out with pairs of electrodes, the electrodes are not uniformly fused, e.g., in a plane at right angles to the electrode axis and the trailing electrode, considered in the direction of welding, will fuse more rapidly. This will result in a differential fusion of the coating composition, particularly at the contact surfaces of the coating composition of both electrodes, because the edges which are present will also fuse faster owing to the high concentration of heat at this point. This may cause atmospheric air to enter the weld material so that a defective welded seam results.

In order to eliminate this disadvantage, it is suitable to provide a coating which has a cross-sectional form which differs from a circular ring, and is enlarged according to a semicircle on the sides so as to deviate from a circular ring. If the arrangement is in a row, it is suitable so to reinforce the edges that they form right angles with respect to the abutting surfaces of the coatings. If the electrode coatings have such a shape and the pairs of electrodes are arranged in a row, the peripheries of adjoining welding wires will snugly contact each other without a gap.

The coating as applied to the core wire has a flat surface, on which the electrodes of a pair abut. The drying operation causes the coating composition to shrink so that the flat abutting surfaces obtained after the application of the coating assume on both sides an inclined position relative to the welding wire. This shrinkage has the result that the two electrodes of a pair will not snugly contact each other throughout the abutting surfaces.

In order to ensure a snug engagement between the two electrodes of the pair, it is desirable to grind the abutting surface of each electrode of the pair to a flat shape after drying. Alternatively, the coating composition may be applied to the core wire around such an excessive arc that a flat abutting surface is obtained by experienie, after drying.

Because a plurality of wires are fed in this welding process, different alloy steels or alloying elements may be jointly welded, which mix in the welding pool to obtain desired alloys. For instance, a pure nickel electrode and an iron electrode may be used to obtain a weld material consisting of 50% nickel and 50% iron. It is also possible to supply bright profile material between the pairs of electrodes in order to increase the rate of fusion. The adjoining coated electrodes shield the bright material against the atmosphere. The additional material may be fed to the welding area in the form of wires or strip. The iron strip or other profile material may be disposed between adjoining pairs of electrodes. Other welding materials or additives may be supplied to the welding area in a similar manner.

An advantage of the process according to the invention resides in the possibility of using electrodes having different core wire alloys or different coating compositions in the row of pairs of electrodes. It has been found that a proper selection of the electrodes used in a row of electrodes enables a combination of the advantages of the different core alloys and/or coating compositions while the disadvantages involved in the core alloys or coating compositions are virtually non-existent.

For instance, it is desirable to use a first pair of electrodes having a good penetration and a subsequent pair of electrodes having a large cross-section to provide for a high rate of fusion while the last pair of electrodes provides for a flat bead layer.

The types of electrodes may not only differ in pairs but the electrodes of each pair may differ in core wire alloy or coating composition. It has been found that the combination of different types of electrodes enables a special promotion of properties desired at a certain time of the welding process or in a certain layer of the weld and enables an improvement in the quality of the welded seam. The properties obtained by the combination of electrode types may relate to the molten material, the slag, the weldability, the strength of the welded seam and any other property. The combination enabled by the simultaneous use of different commercial electrodes may result in welding wire properties which substantially exceed the number of those of the commercial types and enable a better adaptation to the quality requirements of the welded seam.

For instance, the arrangement of pairs of electrodes has afforded a special advantage if the electrode having a basic coating has been arranged before the electrode having an acid coating, considered in the direction of welding. This combination of electrodes arranged in a row results in a particularly good welding rate and a welded seam having a very good appearance. The use of a deep penetration electrode followed by an electrode giving a seam of very neat apearance has also proved highly satisfactory.

It is apparent from these examples that special advantages in the welding process can be obtained by the combination enabled by the arrangement according to the invention.

Another advantage can be obtained by feeding one electrode of a pair or one pair of the row to the welding area at a higher or lower speed.

The subject matter of the application will now be explained with reference to the accompanying drawing.

Figure 2:
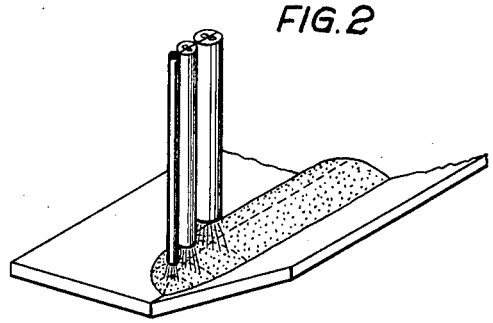
Figure 3:
Figure 4:
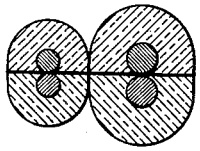
Figure 5:
Figure 6:
Figure 7:
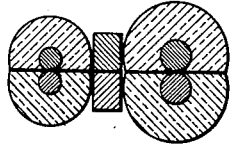

FIG. 1 is a fragmentary cross-sectional view showing pairs of arc-electrodes arranged in a row with the electrodes being of different sizes, FIG. 2 is a perspective view in which the electrodes illustrated in FIG. 1 form theoretically different layers in the welded zone, FIG. 3 is a cross-sectional view showing an electrode wherein the coating is of increased thickness at the edge, FIG. 4 is a cross-sectional view showing two pairs of electrodes having flat contacting surfaces, FIG. 5 is a cross-sectional view of an electrode illustrating in exaggerated form the shrinkage on drying, FIG. 6 is a cross-sectional view showing the electrode in FIG. 5 which has been surface-ground after drying, and FIG. 7 is a cross-sectional view illustrating the supply of additives together with the electrodes.

The layers indicated in FIG. 2 will mix because they consist of fused material. The electrode having the smallest cross-section penetrates more deeply into the joint and deposits the lowermost layer while the succeeding electrode has a larger cross-section and the next succeeding electrode an even larger cross-section to build up the weld material in the cross-section of the seam. In accordance with their cross-section, the electrodes penetrate more or less into the welded joint to build up the material substantially in consecutive layres.

Since leading electrode 1 has a higher rate of fusion than succeeding electrode 2 at the joint between the two electrodes, the coating composition burns off to an even higher level so that air may have access to the welding area and may promote a formation of pores in the welded seam. To oppose a formation of pores, it is suitable to increase the thickness of the coating on the sides. If the coating is of increased thickness at the edge, as is shown in FIG. 3, the electrode will fuse approximately at the abutting surface approximately in unison with the remaining cross-section of the coating. Where a plurality of pairs of electrodes are arranged one beside the other, this increase in wall thickness is such that the side faces of the pairs of electrodes are parallel whereby the pairs have flat abutting surfaces, as is shown in FIG. 4.

The deposition of the layers can be controlled to obtain two different modifications of the process. In a first modification, the fused material from a plurality of pairs of electrodes may be allowed to mix in a welding pool before it solidifies. In this case the use of electrodes having different core materials will result in the formation of an alloy in the welding pool. In the second modification, a layer deposited from one pair of electrodes may be allowed to solidify at least in part before a following layer is deposited so that any mixing or diffusion is restricted to the adjacent zones of such layers and the use of different core materials or core material proportions in different pairs of electrodes will result in a welded seam consisting of a plurality of layers of different materials.

The drying causes the coating to shrink, as is shown in exaggerated form in FIG. 5. After drying, the abutting surfaces no longer form a plane but recede on both sides of the core wires and include an obtuse angle 4 with each other.

In order to ensure a snug contact between the electrodes of each pair in spite of the shrinkage, it is suitable to surface-grind the abutting surface of the individual electrodes after the drying, as is shown in FIG. 6. An additional advantage of this operation resides in that the contact area of the core wire is cleaned and widened.

Additional materials such as an iron strip or strips 5 may be supplied to the welding process as is shown by way of example in FIG. 7.

The feature of the process that different electrodes may be simultaneously used in one and the same welding process enables the provision of alloys or of reactions with the coating composition in the molten pool whereby the welded seam may be favorably influenced.

For instance, the use of a leading electrode having a basic calcium-base coating composition and of a succeeding electrode having an acid, rutile-base coating composition will result in an advantageous welded seam which combines the high tensile strength known to be obtained by the use of basic calcium-base electrodes, as well as a welded seam of neat appearance and having a good transition to the workpiece, as is a known advantage of the acid rutile-base electrode. The combination of a deep penetration electrode with a succeeding electrode having an acid coating affords also the advantage of a good penetration and a neat appearance of the seam. A large number of other examples can be given.

Different electrodes may be used simultaneously to produce predetermined alloys in the molten pool so as to obtain welded seams having special properties.

The possibilities afforded by this process are not restricted to the simultaneous use of two different types of electrodes but include the feeding of the individual electrodes at different speeds. For instance, one electrode of a pair or one pair of electrodes of the row may be fed to the welding area at a different speed to vary the rate of fusion of this electrode or pair.

Particularly in vertical welding it is suitable to provide the welding head of the welding apparatus with a device by which the welding head with the electrodes simulates an electrode movement of the kind usually employed in manual electrode welding, e.g., a zigzag movement.

The welding rate may be further increased by the supply of $CO_2$ to accelerate the fusion process.

What is claimed is:

1. In a continuous welding process of the type in which coated welding wires constituting electrodes are juxtaposed with respect to the welding area and relative movement is effected between such welding area and electrodes; the improvement comprising arranging a plurality of substantially identically shaped welding wires of substantial length in juxtaposition axially of a line of welding and with each welding wire having a conductive core and a coating extending only around part of the periphery of the core in the longitudinal direction of the core; simultaneously feeding all of such welding wires toward the welding area and adjacent said area causing the uncoated portions of the conductive cores of each pair to contact one another to form an elongated totally coated double electrode with said feeding and contacting of the cores of such plurality of pairs establishing a row of juxtaposed coated double electrodes to constitute a bundle of electrodes immediately in advance of the point of welding; feeding said bundle of electrodes to the point of welding; and feeding profile material to the welding area between and in contact with two adjacent double electrodes of said bundle.

2. In a continuous welding process of the type in which coated welding wires constituting electrodes are juxtaposed with respect to the welding area and relative movement is effected between such welding area and electrodes; the improvement comprising arranging a plurality of substantially identically shaped welding wires of substantial length in juxtaposition axially of a line of welding and with each welding wire having a conductive core and a coating extending only around part of the periphery of the core in the longitudinal direction of the core; simultaneously feeding all of such welding wires toward the welding area and adjacent said area causing the uncoated portions of the conductive cores of each pair to contact one another to form an elongated totally coated double electrode with said feeding and contacting of the cores of such plurality of pairs establishing a row of juxtaposed coated double electrodes to constitute a bundle of electrodes immediately in advance of the point of welding; feeding said bundle of electrodes to the point of welding; the fusing of said double electrodes resulting in the formation of a slag and feeding profile material adapted to modify the composition of the slag to the welding area in contact with at least two of said electrodes.

3. In a continuous welding process of the type in which coated welding wires constituting electrodes are juxtaposed with respect to the welding area and relative movement is effected between such welding area and electrodes; the improvement comprising arranging a plurality of substantially identically shaped welding wires of substantial length in juxtaposition axially of a line of welding and with each welding wire having a conductive core and a coating extending only around part of the periphery of the core in the longitudinal direction of the core; simultaneously feeding all of such welding wires toward the welding area and adjacent said area causing the uncoated portions of the conductive cores of each pair to contact one another to form an elongated totally coated double electrode with said feeding and contacting of the cores of such plurality of pairs establishing a row of juxtaposed coated double electrodes to constitute a bundle of electrodes immediately in advance of the point of welding; feeding said bundle of electrodes to the point of welding; and in which said bundle comprises at least one double electrode larger in core cross-section than said leading double electrode.

4. In a continuous welding process of the type in which coated welding wires constituting electrodes are juxtaposed with respect to the welding area and relative movement is effected between such welding area and electrodes; the improvement comprising arranging a plurality of substantially identically shaped welding wires of substantial length in juxtaposition axially of a line of welding and with each welding wire having a conductive core and a coating extending only around part of the periphery of the core in the longitudinal direction of the core; simultaneously feeding all of such welding wires toward the welding area and adjacent said area causing the uncoated portions of the conductive cores of each pair to contact one another to form an elongated totally coated double electrode with said feeding and contacting of the cores of such plurality of pairs establishing a row of juxtaposed coated double electrodes to constitute a bundle of electrodes immediately in advance of the point of welding; feeding said bundle of electrodes to the point of welding; moving said bundle in the longitudinal direction of said row along a line along which said welding area is to be moved; said bundle comprising a leading double electrode having a basic calcium-base coating composition and a succeeding double electrode having an acid rutile-base coating composition.

5. In a continuous welding process of the type in which coated welding wires constituting electrodes are juxtaposed with respect to the welding area and relative movement is effected between such welding area and electrodes; the improvement comprising arranging a plurality of substantially identically shaped welding wires of substantial length in juxtaposition axially of a line of welding and with each welding wire having a conductive core and a coating extending only around part of the periphery of the core in the longitudinal direction of the core; simultaneously feeding all of such welding wires toward the welding area and adjacent said area causing the uncoated portions of the conductive cores of each pair to contact one another to form an elongated totally coated double electrode with said feeding and contacting of the cores of such plurality of pairs establishing a row of juxtaposed coated double electrodes to constitute a bundle of electrodes immediately in advance of the point of welding; feeding said bundle of electrodes to the point of welding; moving said bundle in the longitudinal direction of said row along a line along which said welding area is to be moved; said bundle comprising a leading double electrode and at least one succeeding double electrode larger in cross-section than said leading double electrode and having an acid coating composition.

References Cited by the Examiner

UNITED STATES PATENTS

| | | | |
|---|---|---|---|
| 2,148,228 | 2/39 | Applegate | 219—146 |
| 2,490,023 | 12/49 | Bernard | 219—146 |
| 2,620,423 | 12/52 | Komers et al. | 219—73 |
| 2,654,015 | 9/53 | Landis et al. | 219—73 |
| 2,784,301 | 3/57 | Landis et al. | 210—137 |
| 2,824,951 | 2/58 | Strohmeier | 219—137 |
| 2,868,956 | 6/59 | Lobosco | 219—137 |
| 2,962,579 | 11/60 | Strohmeier | 219—137 |
| 3,024,352 | 3/62 | Danhier | 219—126 |

FOREIGN PATENTS

| | | |
|---|---|---|
| 435,734 | 9/35 | Great Britain. |
| 1,231,922 | 4/60 | France. |

RICHARD M. WOOD, *Primary Examiner.*